United States Patent [19]

Stevens

[11] 4,128,766
[45] Dec. 5, 1978

[54] STRENGTHENED SCINTILLATION CELL

[75] Inventor: William M. Stevens, Loveland, Ohio

[73] Assignee: Randam Electronics, Inc., Cincinnati, Ohio

[21] Appl. No.: 805,629

[22] Filed: Jun. 13, 1977

[51] Int. Cl.² .............................................. G01J 1/58
[52] U.S. Cl. ................................... 250/483; 250/364; 250/380
[58] Field of Search ............... 250/483, 380, 364, 393, 250/389

[56] References Cited

U.S. PATENT DOCUMENTS

| | | | |
|---|---|---|---|
| 2,853,621 | 9/1958 | Ruderman | 250/483 |
| 2,855,520 | 10/1958 | Stoddart et al. | 250/364 |
| 2,961,541 | 11/1960 | Ruderman | 250/364 |
| 3,005,101 | 10/1961 | Bradford et al. | 250/364 |
| 3,169,187 | 2/1965 | Stone et al. | 250/364 |
| 3,296,448 | 1/1967 | Swinehart et al. | 250/483 |
| 3,597,611 | 8/1971 | Harman | 250/364 |

Primary Examiner—Harold A. Dixon
Attorney, Agent, or Firm—Eugene F. Friedman

[57] ABSTRACT

A scintillation cell having cylindrical symmetry, thickened walls, and components with different coefficients of thermal expansion. A pliable epoxy bonds the components together and accommodates their varying expansions during temperature changes. The glass through which passes the luminescence produced by the radioactive particles to the photomultiplier tube sits inside of the cylindrical metal tube to which it attaches. This recessed configuration protects the glass when the cell contacts a flat surface. Producing the cell involves spraying the luminescent material onto the inside of a metal tube. The metal tube receives the luminescent material while both heated and spinning. The spinning, heated cell can receive a multitude of coats of material at each application and, thus, prepares for use rapidly and economically. Subsequently, the substantially clear glass bonds sufficiently far inside of the tube over its open end to provide the recessed configuration.

29 Claims, 4 Drawing Figures

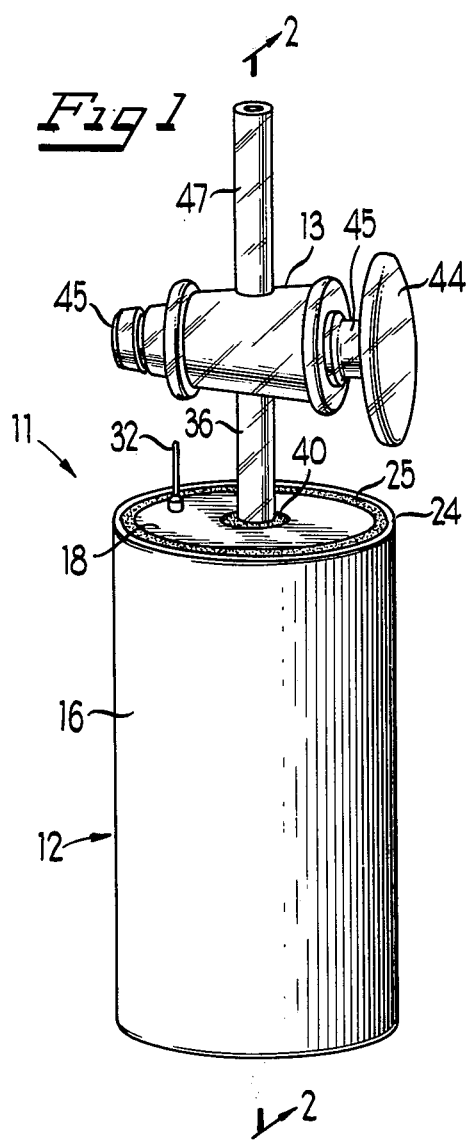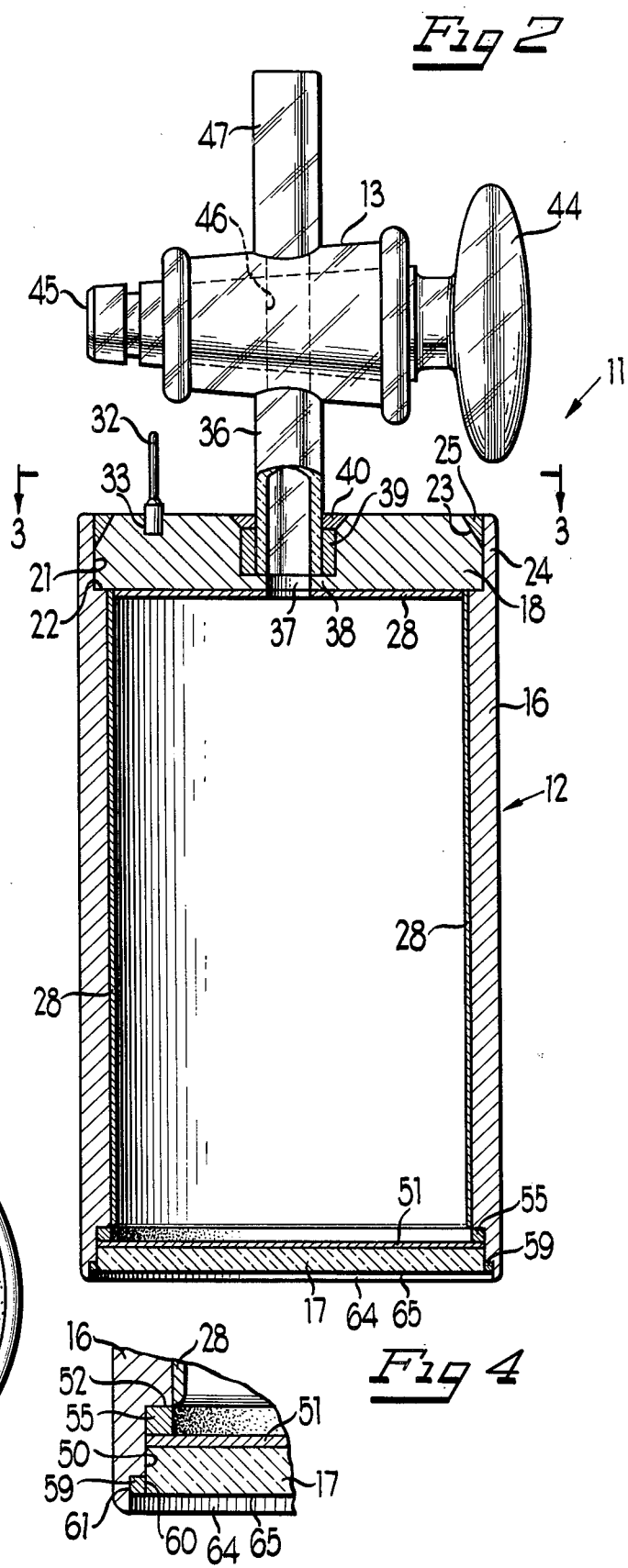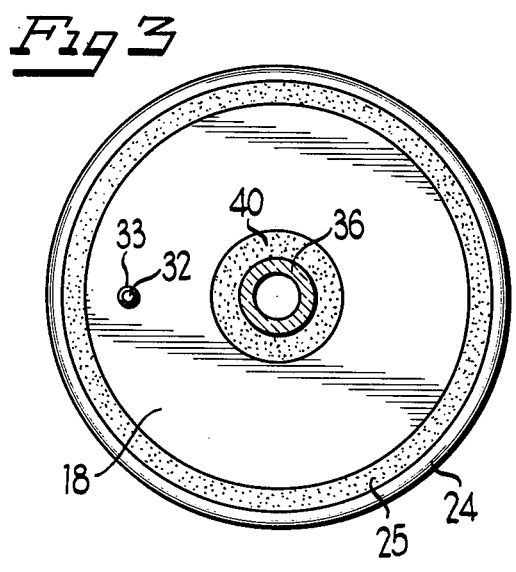

STRENGTHENED SCINTILLATION CELL

BACKGROUND

A scintillation cell operates by allowing a charged particle to impinge upon a luminescent material attached to its surface. The struck luminescent substance then emits a pulse of light, usually in the visible range, to provide an indication of the particle's presence. Measuring the total number of pulses of light thus produced gives a quantitative measurement of the radioactivity in the particular sample.

Previously, scintillation cells, especially those for alpha radiation, assumed the shape of a bell with a transparent glass glued across its open end. A stopcock or other valve attached to the neck of the bell-shaped cell and allowed for the entrance of the sample, usually a gas. A luminescent material, coated on the inside of the bell, converted the charged particles in the sample to light. This light, after passing through the glass at the end of the bell, contacted a photomultiplier tube for detection.

The article, "Improved Low-Level Alpha-Scintillation Counter For Radon" by H. F. Lucas, *Review of Scientific Instruments* 28, 680 (1957), indicates the acceptability of stainless steel, iron, or Kovar for the bell portion of the cell. It also indicates that Pyrex ® glass produces an unacceptably high background counting rate. Kovar became the clearly preferred material since it has the same coefficient of thermal expansion as the glass, to which it attaches.

However, to reduce the expense of the item, especially when using the costly Kovar material, the bell portion of the cell generally has a very thin wall. Moreover, the thin wall presumably assists in drawing the material into the desired bell shape. The bell shape, in turn, provides the thin-walled cell with greater structural strength. Consequently, its displays less susceptability to deformations caused by externally applied forces such as impacts with other objects. Furthermore, the rounded end can also best withstand the positive and negative partial pressures produced by the introduction and withdrawal of sample fluids.

However, the bell cell suffers from various structural shortcomings. Initially, the cell's structure simply does not allow its convenient and safe placement upon a surface. The glass cover over the end of the bell represents the only flat portion of the cell. Yet, placing the glass in contact with another surface runs the risk of possibly scratching the glass and very likely soiling it. Moreover, the cell generally carries a stopcock on the rounded end, furthest removed from the glass. The stopcock generally represents a large fraction of the cell's weight. Thus, setting the cell down with the glass in contact with the supporting surface results in a center of gravity near the top of the cell where the stopcock attaches. This elevated center of gravity accordingly represents a relatively unstable situation. A slight, inadvertent touching of the cell may knock it over, possibly damaging it; the stopcock may break off, the thin wall of the bell may dent, or portions of the scintillating material may dislodge from the inside of the cell.

The thin metal wall of the cell reduces the cost of the item as well as facilitating the drawn bell shape. Yet, it also introduces undesirable features into the item. Simply grabbing the cell too tightly may deform the cell's wall. Even where only temporary, the deformation may nonetheless dislodge the scintillating material on the inside.

Furthermore, the cell generally requires an electrical connection to drain off the charge that may develop upon it. The thin-walled cell permits only a surface contact with a loose-fitting clamp to provide this desired electrical connection. The clamp, however, may loosen or the cell wall may develop a coating of metal oxide, either of which would reduce the efficiency of the electrical contact.

SUMMARY

To obviate at least some of these problems, a scintillation cell generally includes a gas-tight container having a tube of metal with at least one open end. A substantially transparent and gas-impermeable section of material rigidly adheres to the open end of the tube with a gas-tight relationship. The cell should also include an inlet in fluid communication with the interior of the container. The inlet introduces and retains a sample gas inside of the container. Lastly, a luminescent material adhered to the tube on the inside of the container produces the necessary light from the radioactive particles.

The tube of metal, moreover, may display cylindrical symmetry. This type of symmetry mandates an axis along which the shape of the cell does not change between its ends. As a result, the metal tube would have a second open end. Consequently, the container forming part of the cell would include a second section of gas-impermeable material covering this end in a gas-tight manner.

The cylindrically symmetric cell displays various advantages. First, it obviates the necessity of drawing the cell into the shape of a bell. This can save considerable effort and expense in the cell's fabrication. Moreover, it allows for a substantially thicker cell wall because less work need be done upon it. Frequently, moreover, the cell must often possess a particular cross section, usually circular, to match the opening of a photomultiplier tube. Requiring cylindrical symmetry of the cell affords it the greatest volume, surface area, and thus sensitivity, for the predetermined cross section and length.

As a separate aspect, the transparent material, or glass, may occupy a recessed position on the inside of the metal tube. In particular, the tube should extend sufficiently beyond the glass and have sufficient rigidity to, when placed in contact with a flat surface, prevent the surface from touching the glass. This configuration allows the placement of the glass end of the cell upon a surface without incurring any risk of damaging the glass itself.

The glass or quartz used as the lens of the cell naturally has its own peculiar coefficient of thermal expansion. The tube of metal may have the same coefficient of expansion as the glass, as previously, or an entirely different one. The latter alternative allows the choice of a metal based upon such considerations as its inherent radiation, cost, strength, and convenience during the cell's fabrication. However, the two portions of the cell will expand or contract differently under varying thermal conditions. But, bonding the two components together with a pliable adhesive will eliminate the problems that would otherwise occur during such temperature changes. A pliable epoxy represents a suitable agent for this purpose.

Furthermore, the tube may have sufficient thickness and strength to prevent its deformation under the manual pressure than an average person might exert. Such strength will prevent any alteration of the cell's configuration during its normal handling. This has particular importance since even temporary, slight deformations can cause the cell's luminescent material to flake off and become worthless. Moreover, the dislodged luminescent material may settle on the cell's glass and hinder passage of light to the photomultiplier tube. A strong thick wall will prevent such deleterious results and also provide greater integrity to the cell during impacts of an accidental nature.

Where the metal tube has two open ends, the two attached sections of material generally have a thin configuration with flat surfaces. When adhered to the tube, the two sections should generally lie with their flat surfaces parallel and their centers over each other. In other words, the normal through the center of the first section, that is, the line passing through the center and perpendicular to the flat surfaces, should coincide with the normal through the center of the second section. This configuration facilitates the cell's construction and helps achieve the maximum interior volume and surface area permissible with a predetermined length and circular cross section.

Fabricating the cell involves first bonding, in a gastight manner, a substantially transparent gas-impermeable section of material adjacent to the open end of a metal tube. The section of material should cover the open end and actually fit on the inside of the container. The container may then extend sufficiently beyond the section that a flat surface placed in contact with the container over the opening will not contact the glass.

The construction of the cell also involves adhering to the inside of the container the usual luminescent material. Furthermore, an inlet attaches to the container and displays fluid communication with its interior. The inlet has a valve selectively opening and closing it.

Previously, applying the luminescent material to the metallic surface on the inside of the cell involved a lengthy series of steps. The cell, placed on a turntable, would spin rapidly. While rotating, it received a mixture, as a spray, of the scintillator in a vaporizable liquid. The coating would then dry and a multitude of further coats would follow in order to achieve a sufficient thickness for proper scintillation. The number of steps and length of time to accomplish the required coating contributed significantly to the cost of the cell itself.

However, elevating the cell's temperature during at least part of the spraying process appreciably reduces the time and expense involved in its preparation. More luminescent material may attach to the cell's wall during each application or spraying. Accordingly, several of the previously required applications of the mixture become dispensible.

BRIEF DESCRIPTION OF THE FIGURES

FIG. 1 presents an elevational view of a rugged cell in which the container displays cylindrical symmetry.

FIG. 2 gives a cross-sectional view along the line 2—2 of the cell of FIG. 1.

FIG. 3 has a cross-sectional view along the line 3—3 of FIG. 2.

FIG. 4 gives an enlarged view of the lower left hand corner of the cell of FIG. 2.

DETAILED DESCRIPTION

The radiation scintillating cell, shown generally at 11 in FIG. 1, includes the cylindrical container 12 and the stopcock 13. The stopcock 13 acts as a valving inlet device to the interior of the container 12.

Further details of the cell's construction appear in the cross-sectional view of FIG. 2. The metal tube 16 forms the vertical wall of the container 12. As shown in the figures, the tube 16 displays cylindrical symmetry. This signifies that there exists an axis along which the shape of the tube remains constant between its ends. In the figures, this axis of cylindrical symmetry would run vertically. Minor deviations exist on the inside of the metal tube near its ends. These departures from absolute symmetry accommodate the sections of material 17 and 18 which cover the ends of the tube 16.

The tube 16 should normally have a metal composition. This provides it with the desired structural rigidity and the ability to conduct any electric charge it may have received. Extruded aluminum of ⅛ inch thickness provides a very suitable material. This thickness should also provide a barrier to the entrance of external ambient radiation into the interior of the container 12.

Other materials performing equivalently to metal may also find use in the tubular wall 16. Thus, strong plastics which can also adequately conduct away the received electric charge may suffice.

The section of material 18 closes off the top of the container 12 and may also have a composition of aluminum, some other metal, or another equivalently functioning material. Moreover, the tube 16 and the end section 18 could constitute a single integral unit produced by a process such as injection molding. However, bonding two separate pieces together as illustrated seems the more facile and economic method.

The top section 18 sits within the circular ring 21 formed in the end 24 of the metal tube 16. The annular shoulder 22 on the ring 21 serves to properly position the end section 18 relative to the tube 16. The end section 18 has the notch 23 cut out of its upper outer surface. The resulting groove provided by the notch 23 and the end 24 of the tube 16 receives the adhesive 25 which bonds the section 18 to the tube 16. At least part of the adhesive 25 should conduct electricity to assure electrical contact between the tube 16 and the top 18. A conductive epoxy suitably performs these chores. This conductivity removes the electrical charge it may have received and helps maintain the cell's components at a desired potential, usually ground.

With the top section 18 bonded to the tube 16, the cell may now receive its coating of luminescent material 28. As shown in the figure, the material 28 adheres to both the tube 16 and the end section 18. Coating both portions of the cell, of course, achieves the greatest scintillating efficiency. However, merely coating the tube 16 may prove satisfactory for samples with a relatively high concentration of radioactive particles.

The actual material used for the luminescent coating 28 depends upon the nature of the contemplated samples for the cell as well as the detector used with it. A fluorescent material emits its light with substantial immediacy after a charged particle strikes it. Consequently, it commonly finds preference for such cells. A phosphorescent material introduces a delay before the emission of its light. Consequently, it generally receives less use in such applications although all fluorescent materials exhibit to some extent phosphorescent, or delaying, properties. For alpha particles found in samples of material taken from the environment, zinc sulfide has proven itself a satisfactory luminescent material.

The cell wall receives the luminescent material 28 suspended in a vaporizable liquid in the form of a spray. As the liquid evaporates, the material dries and adheres to the wall. For circular cells, the cell itself rotates or spins during the application of the spray to achieve a relatively even coat.

Heating the container 12 immediately prior to or during the application of the spray supplies the heat of evaporation for the liquid to hasten the process. Thus, during a single application, a large amount of the material may attach to the wall. The elevated temperature and the resulting rapid drying preclude drops of the mixture from running down the sides and damaging the surface. Consequently, two or three separate applications may provide a sufficiently thick coating; then, the luminescent material determines the nature of the surface rather than the underlying metal. In comparison, without heat, six or even twelve applications may be necessary. A temperature of at least 70° to 80° C. appears sufficient.

The top section 18 also accommodates two further aspects of the cell 11. The post 32 sits inside the depression 33 and has a permanent mechanical and electrical connection to the top section 18. Conductive epoxy provides this connection. The post 32 accomplishes the actual electrical connection to the body of the container 12 itself. To establish such electrical contact merely requires attaching the usual electrical lead to the post 32. Making the post of the noble metal gold helps avoid its oxidative degeneration.

The top section 18 should have sufficient thickness to allow the embedding of the post 32. However, since the top section 18 also supports the stopcock 13, it will generally embed the post 32 without problem.

The lower stem 36 of the stopcock 13 fits into the opening 37 of the top section 18. The shoulder 38 on the opening 37 limits the inward travel of the stem 36 and properly positions the stopcock 13 relative to the container 12. The O-ring 39 provides a seal between the stopcock 13 and the container 12 while cushioning the former to help prevent its breakage. An epoxy seal 40 provides a permanent bond between the stopcock 13, the container 12, and the O-ring 39.

Rotating the elongated knob 44 of the stopcock stopper 45 opens and closes the stopcock 13 to the passage of fluid to or from the interior of the container 12. With the knob 44 placed vertically, as in FIGS. 1 and 2, the opening 46 through the stopper 45 provides a passageway between the upper and lower stopcock stems 47 and 36. With the passageway thus established, fluids may move into or out of the container 12. When the elongated knob 44 occupies a substantially non-vertical orientation, the opening 46 no longer connects the upper and lower stems 47 and 36, respectively; the container 12 then becomes sealed.

At the other end of the cell, the transparent section of material 17 sits within the groove 50 cut into the wall 16. The section 17 must have substantial transparency, of course, to allow for the egress of the light produced when a charged particle hits the luminescent material 28. Quartz and glass have functioned satisfactorily for the window, with the latter apparently the source of less background radiation.

Before its insertion into the groove 50, the transparent section 17 receives a thin coating 51 of a material such as stannous oxide. This material 51, transparent to light, nonetheless conducts electricity. The layer 51 serves to remove any build up of charge on the section 17 it may have received.

The shoulder 52 on the tube 16 serves to properly position the transparent section 17. The conductive epoxy 55 helps bond the section 17 to the metal tube 16. It also provides for electrical contact between the tube and the conductive layer of stannous oxide 51.

In a groove between the tube 16 and the transparent section 17 appears the additional pliable epoxy 59. It specifically sits between the lateral edge 60 of the transparent section 17 and the vertical surface 61 of the tube 16 cut out for this particular purpose. Since the epoxy 59 only serves a bonding function, it need not be of the conductive variety.

When the transparent section 17 properly sits against the shoulder 52, the tube 16 has the rim 64 which extends out beyond the outer edge 65 of the transparent section 17. The extension 64 protects, at least to some extent, the surface of the transparent 17 from accidental contact with surrounding objects. In particular, a flat surface placed in contact with the extension 64 will not touch the transparent section 17. This protection allows the placement of the cell 11 upon a flat surface with the stopcock 13 pointing up and the transparent section 17 near the surface. The extension 64 prevents damage to the transparent section 17 with the cell 11 stored in this fashion.

EXAMPLE

The tube 16 and the top section 18 undergo degreasing with 1,1,1-trichlorolethane vapor. After placing the end section 18 adjacent to the shoulder 22, three drops of a conductive epoxy formed from ten parts by weight of AG-1 resin with one part AG-1 hardner and three parts #410 thinner (all sold by Thermoset, Inc., Indianapolis, Indiana) are placed approximately 120° apart from each other between the notch 23 and the edge 24. This epoxy establishes electrical contact between the components. A nonconducting epoxy formed from the six parts of DC-590 resin with one part H-8 hardner (also sold by Thermoset, Inc.) then fills the remaining space between the pieces. Twelve hours generally provides sufficient time for the epoxy 25 to cure.

After curing, the hole 33 for the grounding post 32 is drilled into the top section 18. The interior of the container 12, but without the glass 17, and the opening 37 for the stopcock 13 are sandblasted to prepare for further processing.

The sandblasted cell then receives a further degreasing with 1,1,1-trichlorolethane vapor. The degreased cells then enter a recirculating-air oven where they remain until they reach a temperature of approximately 100° C. From the oven, the cell goes to a rotating table where it receives a multitude of coats of luminescent paint applied with an air brush and containing the following ingredients:
  (1) 50.0 grams of a zinc sulfide phosphor sold as pigment #2205 by the United States Radium Corporation of Hackettstown, New Jersey;
  (2) 200 ml. of acetone
  (3) 100 ml. of amyl acetate
  (4) 15 ml. of butylrate dope
The spraying utilizes about 5 ml. of the mixture.

The cell returns to the oven and again reaches a temperature of about 100° centigrade. Further coats of the mixture are then applied until the cell carries two grams or more of the luminescent material. The cell then returns to the oven for an hour to complete the drying of the luminescent material. At this point, the cell should be examined to ascertain that it has a regular coating of the luminescent material on its inside.

The cell is then placed in a shop lathe. With the lathe rotating at minimum speed, the luminescent material from the window seating lip 50, 52, and 61 is removed from the tube 16. An airhose held about 2 feet from the cell removes any remaining loose luminescent material. A cloth dampened with 1,1,1-trichlorolethane effects the final cleaning of the window mounting lip as well as the opening 37 for the stopcock 13. One drop of the conductive epoxy described above attaches the grounding post 32 to the top section 18 at this time.

The O-ring 39 is next placed around the bottom of the stopcock 13 and the assembly placed into the opening 37 in the top section 18. The O-ring 39 is slid to the bottom of the glass stem 36 and the stopcock 13 oriented perpendicular to the top of the container 12. The non-conducting epoxy 40, given above, is placed about the O-ring 39 between the glass stem 36 and the top section 18. After air drying for an hour to allow the escape of any captured air bubbles, the cell, with the stopcock in place, is placed in a recirculating-air oven at about 100° C. for at least 15 minutes.

A thin bead of the above conductive epoxy is placed on the bottom of the cell on the shoulder 56 around the entire cell. A section of quartz 17, with the conducting surface 51 oriented towards the interior of the cell and previously cleaned with a lint-free cloth, is seated against the shoulder 52. The cell is then placed in the oven with the window portion pointing upwards for 2 hours at a temperature of 100° C. After the removal of the cell from the oven, the stopcock stopper 45, with a light coating of silicone high-vacuum grease, is inserted into the stopcock 13.

A visual inspection of the cell, when properly fabricated, should reveal no irregularities. Moreover, the cell should have sufficient fluid tightness to hold a positive pressure of 15 to 20 psi. Placing the cell with this internal positive pressure into water will produce air bubbles at any existing leaks; this, of course, follows the same procedure as for leaks in pneumatic tires.

Accordingly, what is claimed is:

1. A scintillation cell comprising:
   (A) a gas tight container including:
      (1) a tube of metal having cylindrical symmetry and open ends;
      (2) a substantially transparent gas-impermeable first section of material rigidly adhered to one end of said tube in a gas-tight relationship; and
      (3) a gas-impermeable second section of material rigidly adhered to the other end of said tube in a gas-tight relationship;
   (B) inlet means in fluid communication with the interior of said container for introducing and retaining a gas inside said container; and
   (C) a luminescent material coated on said tube and said second section of material on the inside of said container.

2. The cell of claim 1 wherein said tube has a circular configuration on cross-sectional planes taken perpendicular to the axis of said cylindrical symmetry.

3. The cell of claim 2 wherein said inlet means is connected to said second section of material.

4. The cell of claim 3 wherein said first and second sections of material are substantially flat and lie perpendicular to said axis of cylindrical symmetry.

5. The cell of claim 4 including an electrical lead permanently attached to and in electrical contact with said container and wherein said first and second sections of material are in electrical contact with said tube.

6. The cell of claim 4 wherein said tube is an extruded section of aluminum and said section of material is composed of aluminum.

7. The cell of claim 6 wherein said aluminum has a thickness of about ⅛ inch.

8. A scintillation cell comprising:
   (A) a gas-tight container including:
      (1) a tube of metal with at least one open end; and
      (2) a substantially transparent gas-impermeable section of material rigidly adhered to said tube adjacent to an open end, said tube having a sufficient extension beyond said section of material and having sufficient rigidity such that, when a flat surface is placed adjacent to said open end, said extension prevents contact between said first section and said flat surface, said extension having a lesser thickness than substantially all of the remainder of said tube and said section lying substantially abutting a shoulder formed on said tube on the inside of said container;
   (B) inlet means fluid communication with the interior of said container for introducing and retaining a gas inside said container; and
   (C) a luminescent material adhered to said tube on the inside of said container.

9. The cell of claim 8 wherein said tube has cylinderical symmetry and said section of material is a first section of material rigidly adhered to one end of said tube and further including a second section of material rigidly adhered to the other end of said tube in a gas-tight relationship.

10. The cell of claim 9 including luminescent material coated on said section of material on the inside of said container.

11. The cell of claim 9 wherein said first section of material has a composition of a glass with a different coefficient of thermal expansion than the metal of said tube and a pliable epoxy bonds said first section to said tube.

12. The cell of claim 11 wherein said tube is formed from extruded aluminum which has a thickness of about ⅛ inch.

13. The cell of claim 12 wherein including an electrical lead permanently attached to and in electrical contact with said container and wherein said first and second sections of material are in electrical contact with said tube.

14. A scintillation cell comprising:
   (A) a gas-tight container including:
      (1) a tube of metal with at least one open end, said metal having a first coefficient of expansion;
      (2) a substantially transparent gas-impermeable section of material having a second coefficient of expansion; and
      (3) pliable adhesive means for rigidly adhering in a gas-tight manner said section of material to said open end of said metal tube;

(B) inlet means in fluid communication with the interior of said container for introducing and retaining a gas inside said container; and (C) a luminescent material coated on said tube on the inside of said container.

15. The cell of claim 14 wherein said pliable adhesive means is an epoxy.

16. The cell of claim 15 wherein said tube is extruded section of aluminum which has a thickness of about ⅛ inch.

17. The cell of claim 16 including an electrical lead permanently attached to and in electrical contact with said container and wherein said first and second sections of material are in electrical contact with said tube.

18. A scintillation cell comprising:

(A) a gas-tight container including:

(1) a tube of metal with at least one open end;

(2) a substantially transparent gas-impermeable section of material rigidly adhered to said tube at said open end in a gas-tight relationship; and (3) conductive epoxy in contact with and establishing an electrical path between said tube and said section of material; and (B) inlet means in fluid communication with the interior of said container for introducing and retaining a gas inside said container; and (C) a luminescent material coated on said tube on the inside of said container.

19. The cell of claim 18 wherein said section of material is adhered to the inside of said metal tube adjacent to said open end, said tube having a sufficient extension beyond said first section of material and having sufficient rigidity such that, when a flat surface is placed adjacent to said open end, said extension prevents contact between said first section and said flat surface, said extension having a lesser thickness than substantially all of the remainder of said tube.

20. The cell of claim 19 wherein said open end is a first open end, said section of material is a first section of material, said tube has cylindrical symmetry and a second open end, said container includes a second section of material rigidly adhered to said gas-impermeable tube at said second open end in a gas-tight relationship at least partly with a conductive epoxy, and said first and second sections of material are substantially flat and lie perpendicular to said axis of cylindrical symmetry.

21. The cell of claim 20 including luminescent material coated on to said second section of material on the inside of said container.

22. The cell of claim 21 wherein said tube and said first section have different coefficients of thermal expansion and a pliable adhesive adheres said first section to said tube.

23. The cell of claim 22 including an electrical lead permanently attached to and in electrical contact with said container and wherein said first and second sections of material are in electrical contact with said tube.

24. A method of constructing a scintillation cell comprising:

(A) bonding in a gas-tight manner a substantially transparent gas-impermeable section of material to the inside of a metal container adjacent to and covering an opening in said container and abutting a shoulder formed inside said container with said container extending sufficiently beyond said section of material that a flat surface placed in contact with said container over said opening will not contact said section of material;

(B) coating at least a portion of the the inside surface of said container with a luminescent material; and (C) attaching to said container and in fluid communication with the interior of said container an inlet with a valve selectively opening and closing said inlet.

25. The method of claim 24 wherein said section of material and said metal container have different coefficients of thermal expansion and wherein said section of material is bonded to said container with a pliable epoxy.

26. The method of claim 25 wherein said section of material is a first section of material, said opening in said container is a first opening and said container further has a second opening and further including the step of bonding a second section of material to said container in a gas-tight manner over said second opening and said first and second sections are bonded to said container, at least in part, with a conductive epoxy.

27. The method of claim 26 wherein the step of adhering to the inside of said container a luminescent material is accomplished by:

(A) increasing and temperature of said surface above ambient temperature;

(B) spinning said container;

(C) while spinning said container and while the temperature of said surface is above ambient temperature, spraying a mixture of a luminescent material and a vaporizable liquid upon said heated surface until a plurality of coats of said mixture has been applied;

(D) drying the applied coats of said mixture; and (E) after said applied coats of said mixture have dried, applying and drying a further plurality of coats of said mixture.

28. A method of adhering a luminescent material to a metallic surface on the inside of a circular container comprising:

(A) increasing the temperature of said metallic surface above ambient temperature;

(B) spinning said container;

(C) while spinning said container and while the temperature of said metallic surface is above ambient temperature, spraying a mixture of a luminescent material and a vaporizable liquid upon said heated metallic surface until a plurality of coats of said mixture has been applied;

(D) drying the applied coats of said mixture; and (E) after said applied coats of said mixture have dried, applying and drying a further plurality of coats of said mixture.

29. The method of claim 28 wherein said metallic surface is at a temperature of at least about 70°–80° C. during at least a part of the time that said mixture is applied to said surface.

* * * * *